US008072447B2

(12) United States Patent
Moriyama et al.

(10) Patent No.: US 8,072,447 B2
(45) Date of Patent: Dec. 6, 2011

(54) DISPLAY DRIVE DEVICE

(75) Inventors: Seiichi Moriyama, Kyoto (JP); Mamoru Seike, Osaka (JP)

(73) Assignee: Panasonic Corporation, Osaka (JP)

( * ) Notice: Subject to any disclaimer, the term of this patent is extended or adjusted under 35 U.S.C. 154(b) by 704 days.

(21) Appl. No.: 12/236,021

(22) Filed: Sep. 23, 2008

(65) Prior Publication Data

US 2009/0122048 A1 May 14, 2009

(30) Foreign Application Priority Data

Nov. 13, 2007 (JP) ................................ 2007-294858

(51) Int. Cl.
*G06F 3/038* (2006.01)
*G09G 3/28* (2006.01)

(52) U.S. Cl. .......................... 345/212; 345/60; 345/204

(58) Field of Classification Search .................. 345/212
See application file for complete search history.

(56) References Cited

U.S. PATENT DOCUMENTS 5,874,935 A * 2/1999 Nishi et al. .................... 345/100
7,078,865 B2 7/2006 Sano et al.
7,084,852 B2 8/2006 Nishi et al.
7,116,137 B2 10/2006 Nautiyal et al.
7,319,347 B2 1/2008 Cho et al.
2003/0174119 A1 * 9/2003 Nishi et al. .................... 345/100
2008/0036749 A1 * 2/2008 Moriyama et al. ............ 345/204

* cited by examiner

*Primary Examiner* — Richard Hjerpe
*Assistant Examiner* — Andrew Schnirel
(74) *Attorney, Agent, or Firm* — McDermott Will & Emery LLP

(57) ABSTRACT

A display drive device includes a low-voltage circuit section driven by a first power supply potential and a high-voltage circuit section driven by a second power supply potential higher than the first power supply potential. The display drive device further includes a voltage supply circuit for supplying a third power supply potential different from the first and second power supply potentials, a common power supply line for connecting the third power supply potential to each of a plurality of output terminals, an output selection switch circuit for temporarily switching between display data output via the high-voltage circuit section to each output terminal, and the common power supply line, during a predetermined period, and a display data determining circuit for generating a control signal for controlling the output selection switch circuit. Thereby, the common power supply line is temporarily selected and controlled without signal collision when display data is switched.

13 Claims, 15 Drawing Sheets

DISPLAY DRIVE DEVICE

BACKGROUND OF THE INVENTION

1. Field of the Invention

The present invention relates to a display drive device for driving a display panel.

2. Description of the Related Art

In recent years, plasma display panels (PDPs) that have a thin thickness, a large screen, and high definition, have attracted attention. The PDP comprises a plurality of discharge cells (pixels) arranged in a matrix. An image is displayed on the PDP by utilizing light emission when discharge occurs in the discharge cells.

A typical AC PDP has a plurality of display electrodes arranged in parallel and a plurality of data electrodes arranged orthogonal to these display electrodes. A display drive device drives these data electrodes, and therefore, can be considered to drive capacitive load.

As the screen size, definition and luminance of PDPs have been more and more increased, display drive devices for driving the PDPs increasingly require a larger number of outputs and a higher voltage. Therefore, it is important to suppress power consumption and heat generation when the data electrode is driven.

When different potentials are applied to two data electrodes, a space between the electrodes functions as a capacitor. In other words, capacitive load is generated. When the capacitive load is driven, a large amount of power is consumed. As a conventional technique of reducing power consumption, the followings are known.

U.S. Pat. No. 7,116,137 discloses a display drive device that converts display data into a predetermined voltage level and outputs the resultant data to data electrodes. In the display drive device, a common floating potential line in a floating state is provided that is normally connected via selection switches to all output terminals in a wired OR manner. When a change in data level is detected on an output terminal at a timing of switching display data (i.e., between before and after display data is switched), the output terminal is controlled so that the output terminal temporarily goes to a high impedance (Hi-Z) at a predetermined timing (within a period when display data is switched and panel display is not performed). At the same time, the corresponding selection switch is controlled so that the output terminal is connected via the selection switch to the wired OR-connected floating potential line. By this control, display output is temporarily interrupted at output terminals at which data is changed by switching display data, so that all the output terminals are connected to the common floating potential line. In this case, the output terminals having a change in level are short-circuited, so that capacitance charges accumulated by displaying are transferred between terminals that have immediately previously output an H (=High) level and terminals that have immediately previously output an L (=Low) level. Therefore, the common floating potential line in the floating state is settled at a potential that is determined, depending on the number of H-level output terminals and the number of L-level output terminals. For example, when, of the terminals having a change in data, the number of H-output terminals is the same as the number of L-output terminals, the potential of the common floating potential line is ideally VDD/2 (VDD is the H-level potential of a display output). Therefore, the next drive operation only needs to be performed from VDD/2 to GND or VDD, whereby drive power can be reduced. Thus, this is a two-step drive technique.

U.S. Pat. No. 7,319,347 discloses another two-step drive technique in which panel electrodes and a capacitor having a load capacitance sufficiently larger than that accumulated between each panel electrode are connected to a common line corresponding to the floating potential line of U.S. Pat. No. 7,116,137 described above. The capacitance potential of the capacitor is previously set to be VDD/2. Charge and discharge are performed between the capacitor capacitance and an output terminal that has a change in data level between before and after display data is switched, so as to transfer accumulated charges so that the output terminal has the potential VDD/2, which is advantageous to the next drive operation.

SUMMARY OF THE INVENTION

In the display drive device of U.S. Pat. No. 7,116,137 described above, the common floating potential line varies for each piece of display data. For example, when display data is switched, then if all output terminals go from the H level to the L level, the advantageous effect is not obtained for such display data. Thus, there is a pattern dependence, so that power consumption cannot be sufficiently reduced. Also, a tri-state output and the common floating potential line are connected in a wired OR manner. Therefore, if the timing of the selection switch varies depending on the wiring path or the like, both the tri-state output and the common floating potential line may be selected, resulting in signal collision.

If signal collision occurs, any display data output has an influence on the common floating potential line, the potential of the common floating potential line is likely to change, i.e., vary for each piece of display data.

In the display drive device of U.S. Pat. No. 7,319,347 described above, the potential VDD/2 is initially applied to the capacitor by any means, and thereafter, electronic charges are not additionally supplied to the capacitor from the outside, for example. If electronic charges are even once lost during an operation when a change occurs in a characteristic (e.g., small leakage occurs, power supply leakage occurs, etc.), the output terminal cannot be restored to the original potential VDD/2, for example.

To solve these problems, a display drive device according to the present invention includes a low-voltage circuit section driven by a first power supply potential, a high-voltage circuit section driven by a second power supply potential higher than the first power supply potential, a voltage supply circuit for supplying a third power supply potential higher than or equal to the first power supply potential and different from the second power supply potential, a common power supply line for connecting the third power supply potential to each of a plurality of output terminals, an output selection switch circuit for temporarily switching between display data output via the high-voltage circuit section to each output terminal, and the common power supply line, during a predetermined period, and a display data determining circuit for generating a control signal for controlling the output selection switch circuit.

The display data determining circuit has a function of, when one piece of display data is switched to another piece of display data, determining a change in level of display data in the same column of a display panel from both the pieces of display data, a function of determining how electric charges accumulated between each output terminal due to a display operation are changed due to the next display operation, and a function of generating a control signal to be supplied to the output selection switch circuit based on these determination results. When it is determined in the display data determining circuit that there is a change in display data level between before and after display data is switched, display data output to each output terminal having a change and the common power supply line are temporarily switched for a predetermined period, based on the control signal of the display data determining circuit, so that the display data is caused to be temporarily at the third power supply potential. Thereby, there is not pattern dependence of display data, and in addition, the voltage of the voltage supply circuit is invariably supplied to the common power supply line, resulting in an invariably stable voltage. Therefore, power consumption of a display drive operation can be optimally reduced. Also, heat generation by a display drive operation can be reduced in an amount corresponding to the reduction of power consumption.

According to the present invention, the potential of an output terminal having a change in data output between before and after display data is switched is forcedly caused to go to the third power supply potential before driving data to be next displayed. Therefore, a change in potential of the output terminal during a drive operation can be reduced, thereby making it possible to suppress power consumption and heat generation of the display drive device. Also, there is not data dependence of display data, and in addition, the common power supply line can be invariably stably maintained at the third power supply potential.

Moreover, by performing a drive operation in a stepwise manner, a peak current during output transition of display data can be reduced, so that EMI occurring in the display drive device can also be reduced.

DETAILED DESCRIPTION OF THE PREFERRED EMBODIMENTS

Hereinafter, embodiments of the present invention will be described with reference to the accompanying drawings.

Figure 1:
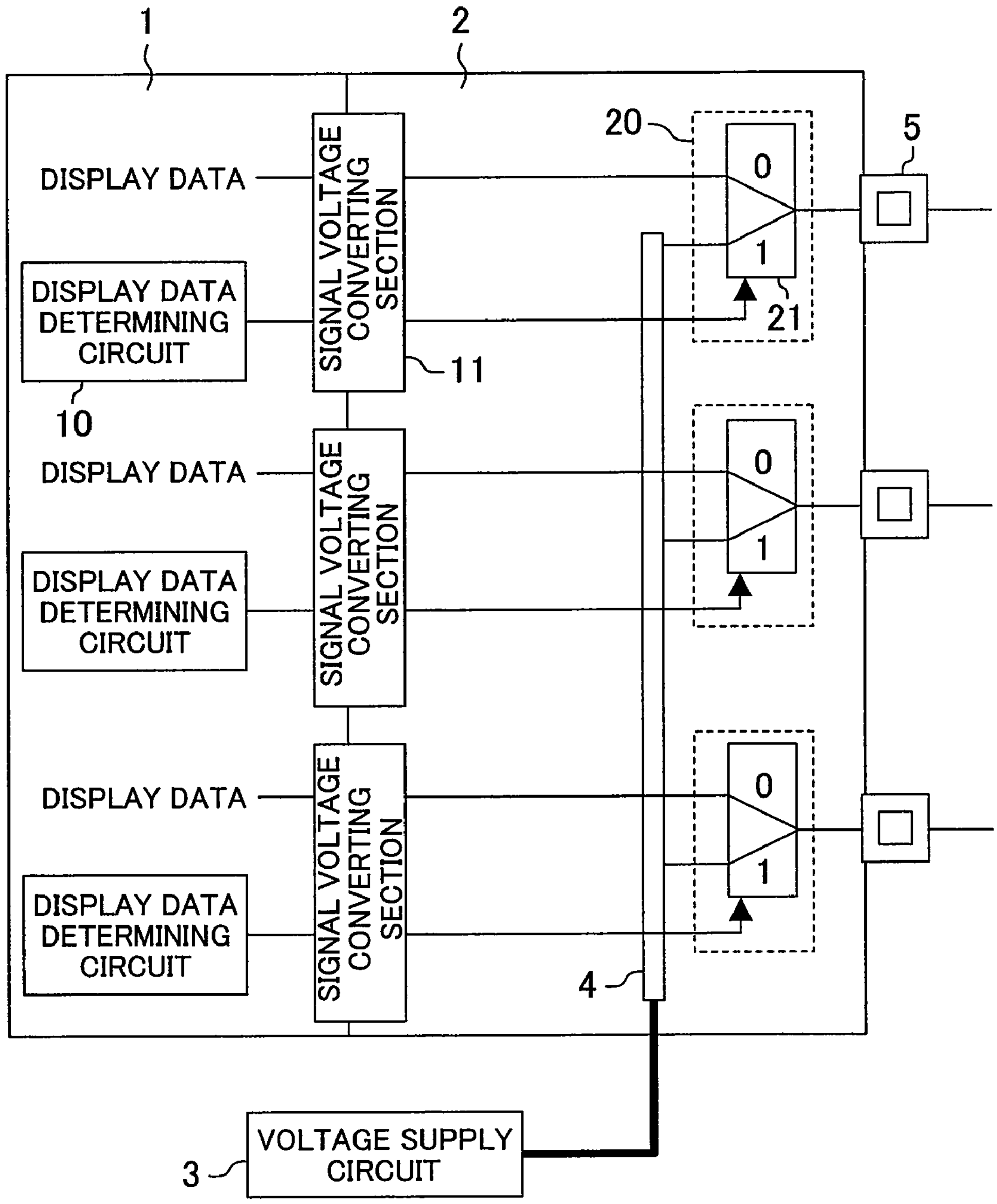
FIG. 1 shows an exemplary configuration of a display drive device according to the present invention.

FIG. 1 shows an exemplary configuration of a display drive device according to the present invention. In FIG. 1, the display drive device comprises a low-voltage circuit section 1, a high-voltage circuit section 2, a voltage supply circuit 3, a common power supply line 4, output terminals 5, display data determining circuits 10, signal voltage converting sections 11, and output selection switch circuits 20 each including a selector 21 having two inputs and one output. For example, a first power supply potential for driving the low-voltage circuit section 1 is 3.3 to 5 V, a second power supply potential for driving the high-voltage circuit section 2 is about 80 V, a third power supply potential that the voltage supply circuit 3 supplies to the common power supply line 4 is about 40 V.

The output selection switch circuit 20 forcedly causes the potential of an output terminal 5 to be equal to the third power supply potential if the data output of the output terminal 5 changes between before and after display data is switched, thereby making it possible to reduce a change in potential of the output terminal 5 during a drive operation. In addition, since the third power supply potential is applied from the voltage supply circuit 3 to the common power supply line 4, the potential of the common power supply line 4 is invariably stable, so that a spike does not occur during a switching operation.

With the configuration of FIG. 1, signal collision can be advantageously avoided by using the two-input one-output selector 21. In addition, since the Hi-Z state does not exist inside the display drive device, the display drive device is not likely to suffer from an influence of noise. Moreover, even when there are variations in switch timing among the output terminals 5, other terminals are not affected, since the power supply signal has a higher intensity.

Note that the voltage supply circuit 3 is desirably a charge pump circuit, which does not consume power very much. The display data determining circuit 10 preferably compares pieces of data held by two latches.

Also, as the voltage supply circuit 3, a circuit equipped with a smoothing capacitor is desirably provided so as to supply a stabler potential.

Figure 2:
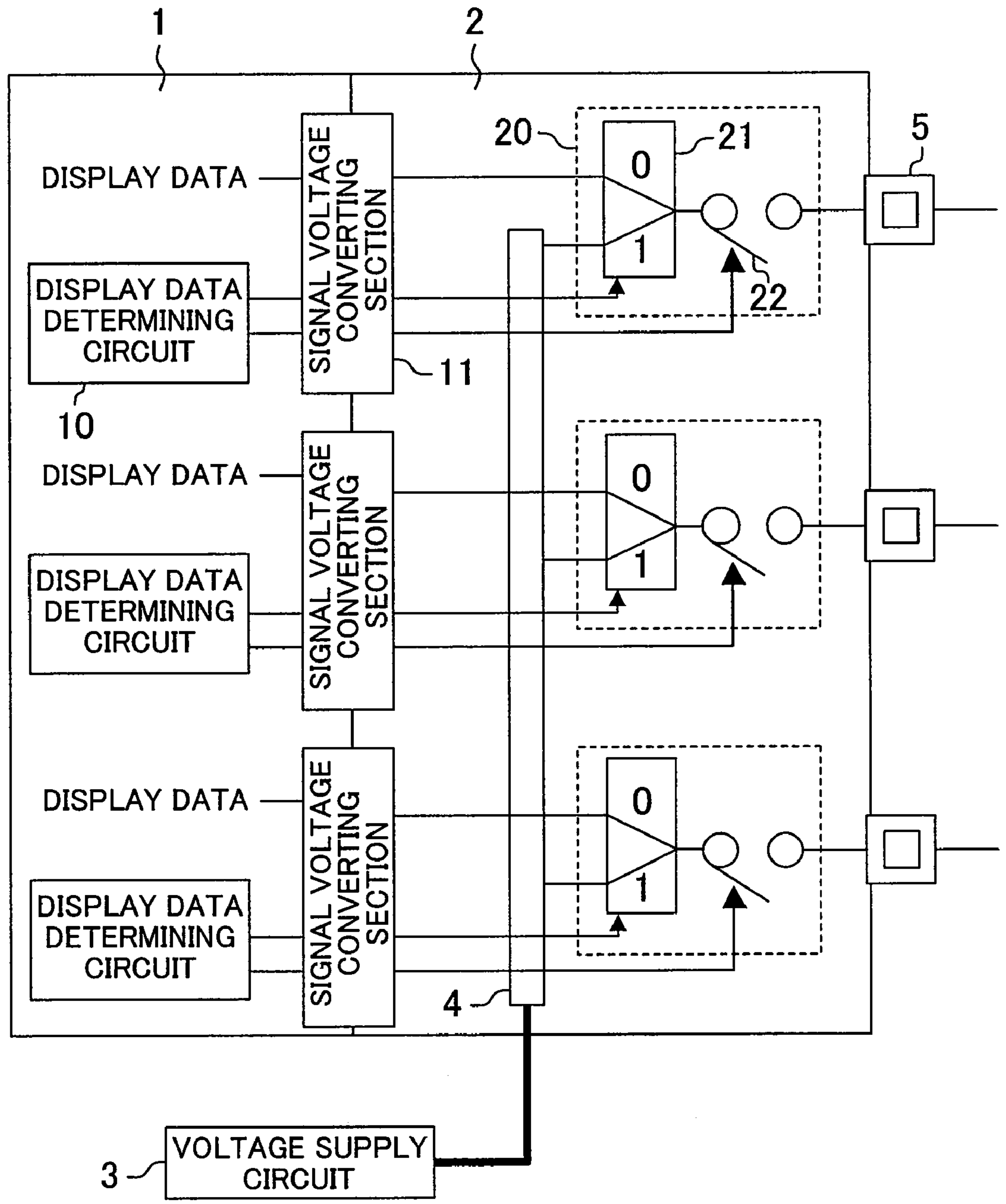
FIG. 2 is a diagram showing another exemplary configuration of the display drive device of the present invention.

FIG. 2 shows another exemplary configuration of the display drive device of the present invention. In FIG. 2, an output connection/disconnection switch 22 for selecting an open or closed state is provided between the output of a selector 21 having two inputs and one output included in an output selection switch circuit 20, and an output terminal 5.

When the output selection switch circuit 20 is used to switch a path from display data to the power supply potential of the voltage supply circuit 3, the output connection/disconnection switch 22 is initially opened, then the two-input one-output selector 21 is switched to the power supply potential of the voltage supply circuit 3, and then after a lapse of a time enough for all the output terminals 5 to go to the stationary state, the output connection/disconnection switch 22 is closed. Conversely, when a path is switched from the power supply potential of the voltage supply circuit 3 to display data, the output connection/disconnection switch 22 is initially opened, then the two-input one-output selector 21 is switched to the display data, and after a lapse of a time enough for all the output terminals 5 to go to the stationary state, the output connection/disconnection switch 22 is closed.

As described above, with the configuration of FIG. 2, the two-input one-output selector 21 and the output connection/disconnection switch 22 are controlled in accordance with a switching sequence, thereby making it possible to reliably eliminate signal collision at each output terminal 5 and an influence of timing variations.

Figure 3:
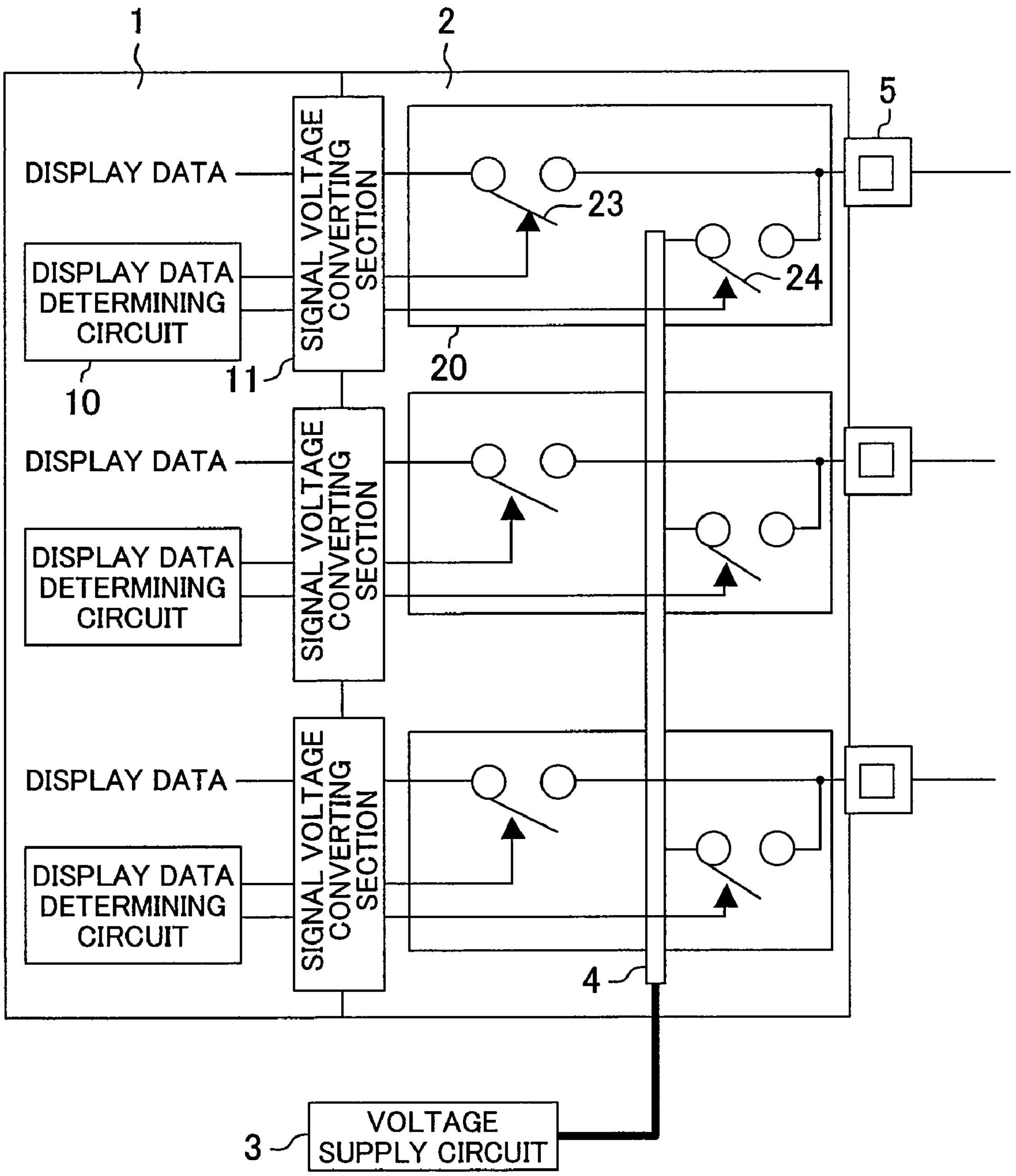
FIG. 3 is a diagram showing still another exemplary configuration of the display drive device of the present invention.
Figure 4:
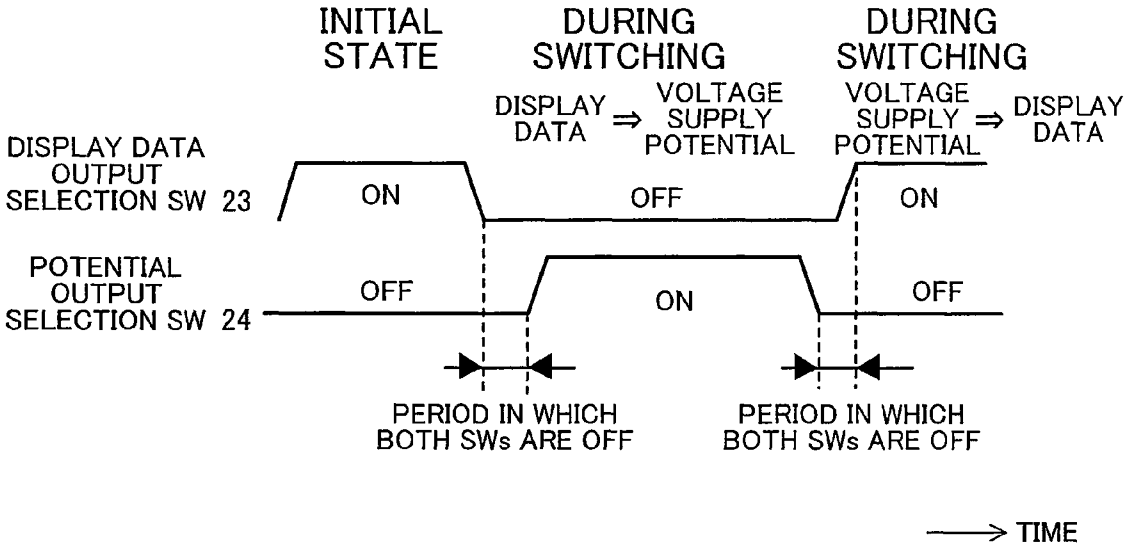
FIG. 4 is a timing chart showing an operation of the display drive device of FIG. 3.

FIG. 3 shows still another exemplary configuration of the display drive device of the present invention. FIG. 4 shows an operation of the display drive device of FIG. 3. Each output selection switch circuit 20 of FIG. 3 comprises a display data output selection switch 23 and a potential output selection switch 24.

When display data is switched to the power supply potential of a voltage supply circuit 3 in the output selection switch circuit 20, a display data output selection switch 23 is initially opened while a potential output selection switch 24 is in the opened state (default). As a result, the display data output selection switch 23 and the potential output selection switch 24 are both opened. After a lapse of a time enough for all the output terminals 5 to go to the stationary state, the potential output selection switch 24 is closed. Note that the potential output selection switch 24 is opened at a predetermined time.

Conversely, when the power supply potential of the voltage supply circuit 3 is switched to display data, the potential output selection switch 24 is initially opened while the display data output selection switch 23 is in the opened state. As a result, the display data output selection switch 23 and the potential output selection switch 24 are both opened. After a lapse of a time enough for all the output terminals 5 to go to the stationary state, the display data output selection switch 23 is closed.

With the configuration of FIG. 3, by providing a period when both the switches 23 and 24 are simultaneously OFF, signal collision at the output terminal 5 can be prevented, and an influence of variations in operation timing of the selection switch can be eliminated.

Figure 5:
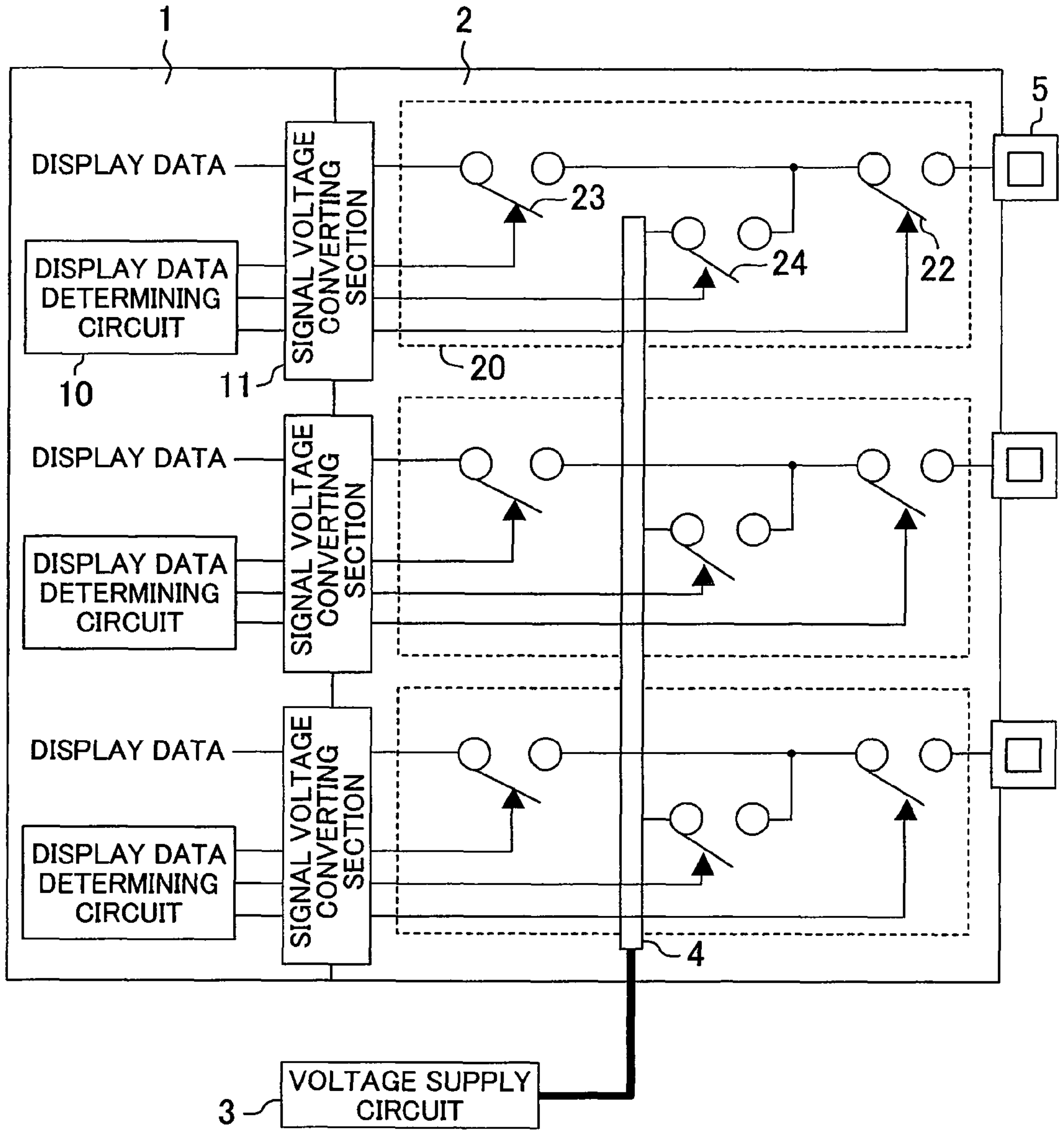
FIG. 5 is a diagram showing still another exemplary configuration of the display drive device of the present invention.
Figure 6:
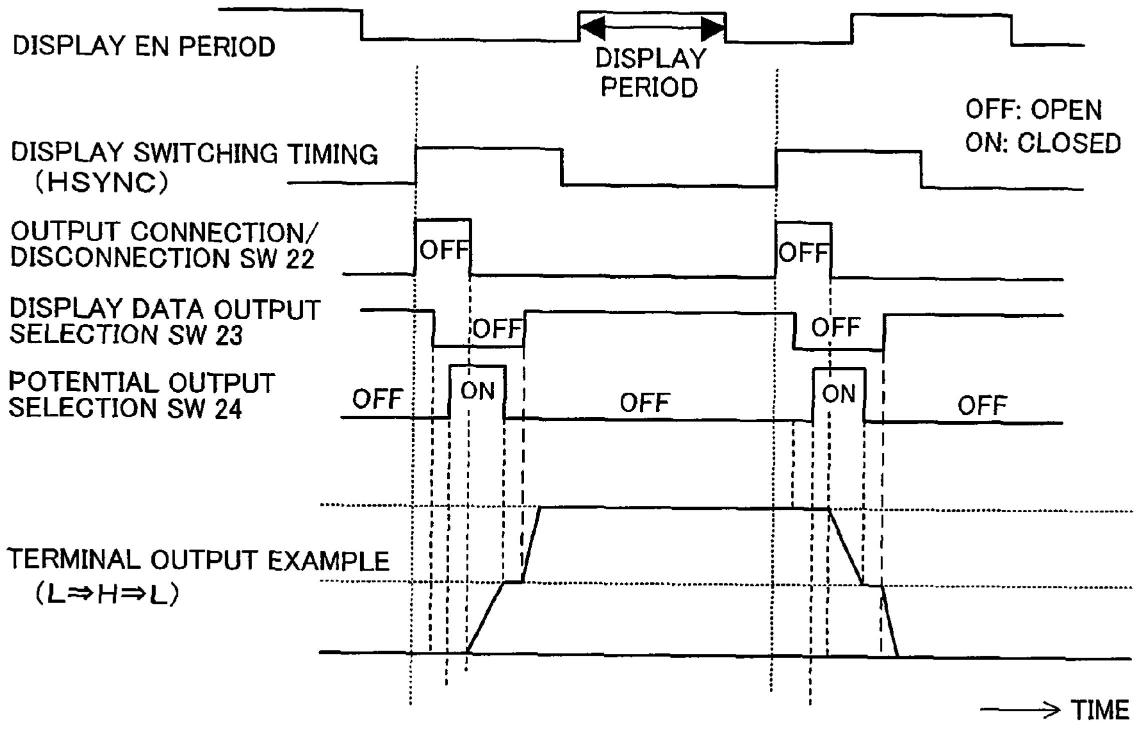
FIG. 6 is a timing chart showing an operation of the display drive device of FIG. 5.

FIG. 5 shows still another exemplary configuration of the display drive device of the present invention. FIG. 6 shows an operation of the display drive device of FIG. 5. The configuration of FIG. 5 is obtained by adding an output connection/disconnection switch 22 to the configuration of FIG. 3. Specifically, the output connection/disconnection switch 22 is provided between a wiring branching point of the display data output selection switch 23 and the potential output selection switch 24, and the output terminal 5.

With the configuration of FIG. 5, when the output connection/disconnection switch 22 is opened, a transient state occurring when the display data output selection switch 23 and the potential output selection switch 24 are switched can be prevented from propagating to the output terminal 5. Therefore, the output connection/disconnection switch 22 may be closed after the output terminal 5 goes to the stationary state. In this case, selection can be switched irrespective of timings of switching the display data output selection switch 23 and the potential output selection switch 24. In other words, if the output connection/disconnection switch 22 is in the OFF period, the timings of the display data output selection switch 23 and the potential output selection switch 24 may differ from each other to some extent. By performing a control in accordance with such a switching sequence, an influence of signal collision on the output terminal 5 and an influence of variations in timing of the display data output selection switch 23 or the potential output selection switch 24 at the output terminals 5 can be reliably eliminated.

Figure 7:
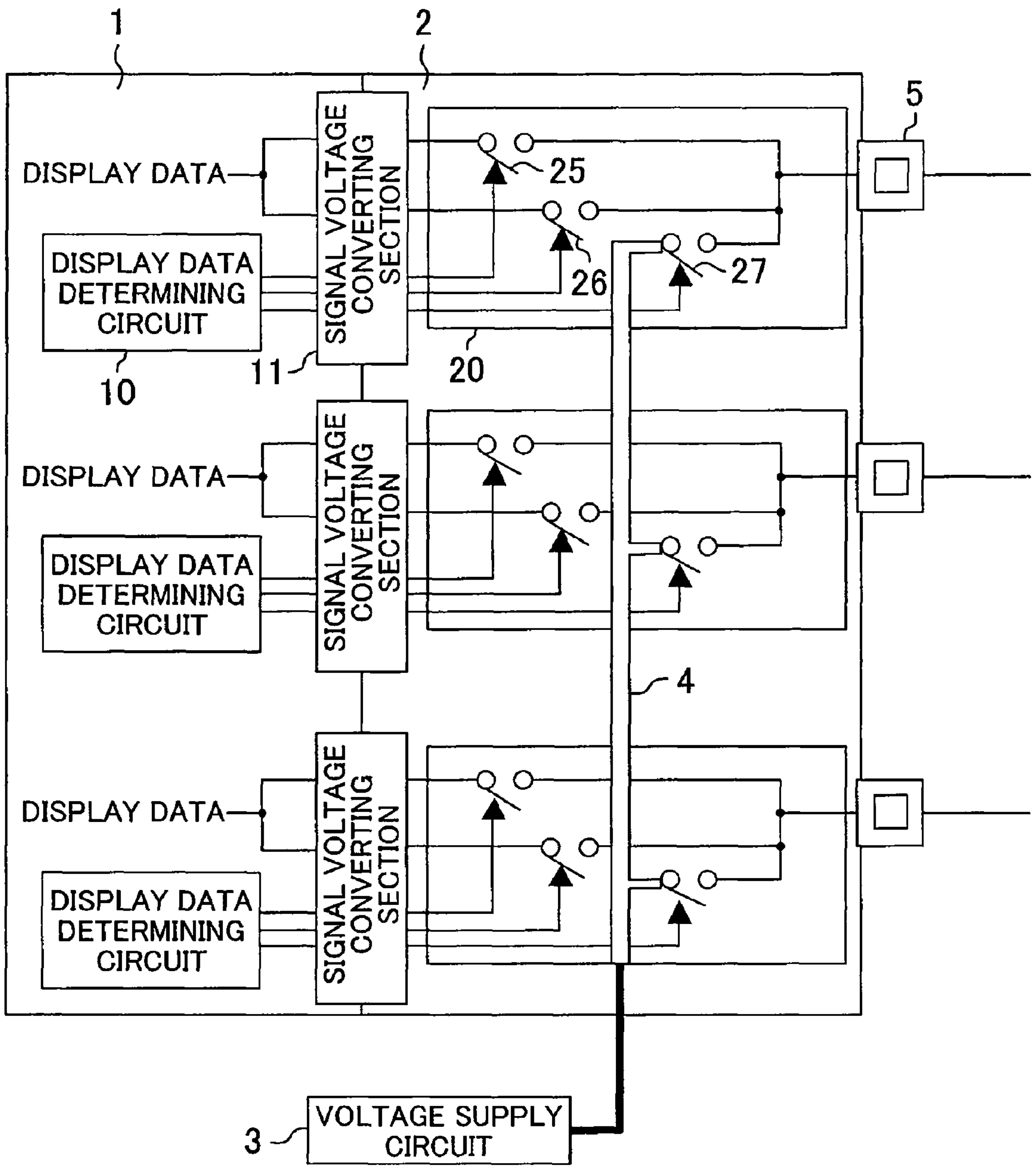
FIG. 7 is a diagram showing still another exemplary configuration of the display drive device of the present invention.
Figure 8:
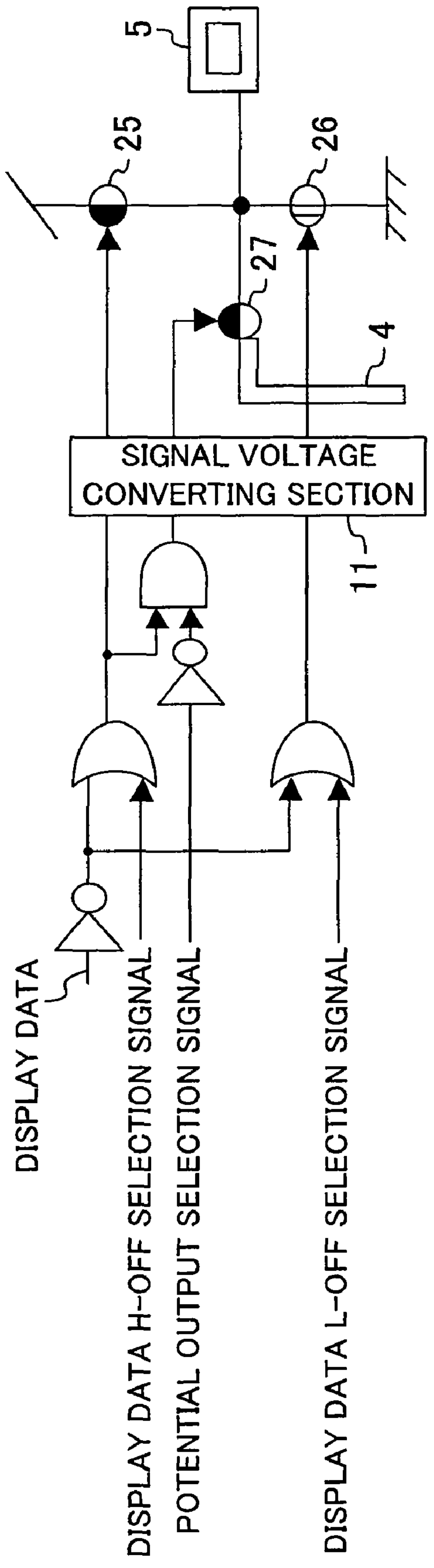
FIG. 8 is a circuit diagram showing a specific example of an output selection switch circuit of FIG. 7.

FIG. 7 shows still another exemplary configuration of the display drive device of the present invention. FIG. 8 shows a specific example of an output selection switch circuit 20 of FIG. 7. The output selection switch circuit 20 of FIG. 7 comprises a display data output H selection switch 25, a display data output L selection switch 26, and a potential output selection switch 27. As shown in FIG. 8, for example, the display data output H selection switch 25 can be implemented using a P-channel MOSFET, the display data output L selection switch 26 can be implemented using an N-channel MOSFET, and the potential output selection switch 27 can be implemented using a P-channel MOSFET.

The output selection switch circuit 20 of FIG. 7 is configured to select one of the three switches 25 to 27, and the output terminal 5 has a four-valued (H, L, a voltage supply circuit potential, and Hi-Z) output. Note that a potential output selection signal and the like in FIG. 8 are generated based on a horizontal synchronization (HSYNC) signal or the like by the display data determining circuit 10.

An exemplary switching sequence in FIG. 7 will be described as follows. When display data is switched to the power supply potential of the voltage supply circuit 3, the display data output H selection switch 25 and the display data output L selection switch 26 are both initially opened while the potential output selection switch 27 is in the opened state. Here, the level (H or L) of display data is not considered. Next, the potential output selection switch 27 is closed. Conversely, when the power supply potential of the voltage supply circuit 3 is switched to display data, the potential output selection switch 27 is initially opened while the display data output H selection switch 25 and the display data output L selection switch 26 are both in the opened state. Next, the display data output H selection switch 25 and the display data output L selection switch 26 are both released from the forcedly opened state, and are opened or closed, depending on the level (H or L) of display data.

Figure 9:
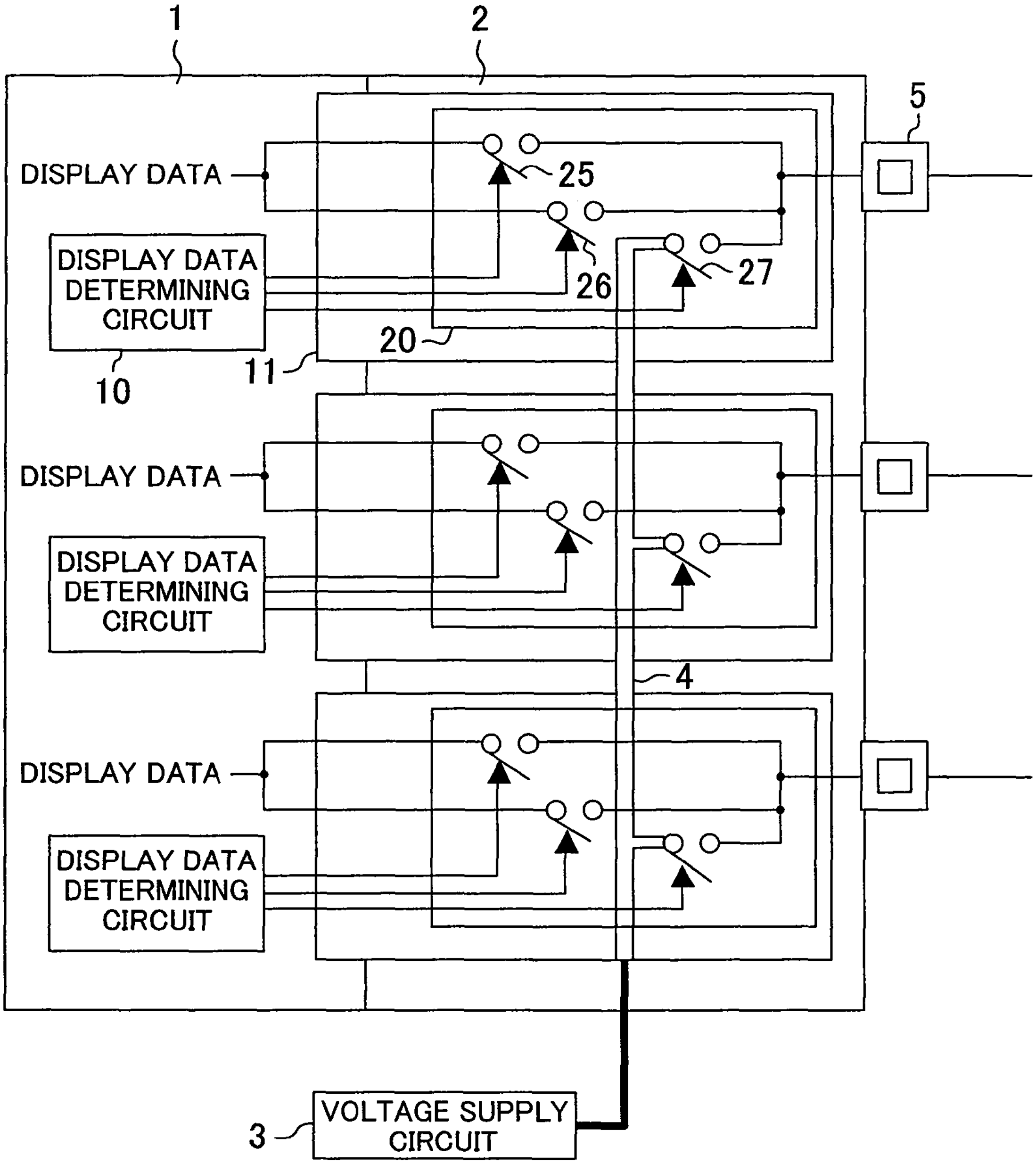
FIG. 9 is a diagram showing still another exemplary configuration of the display drive device of the present invention.
Figure 10:
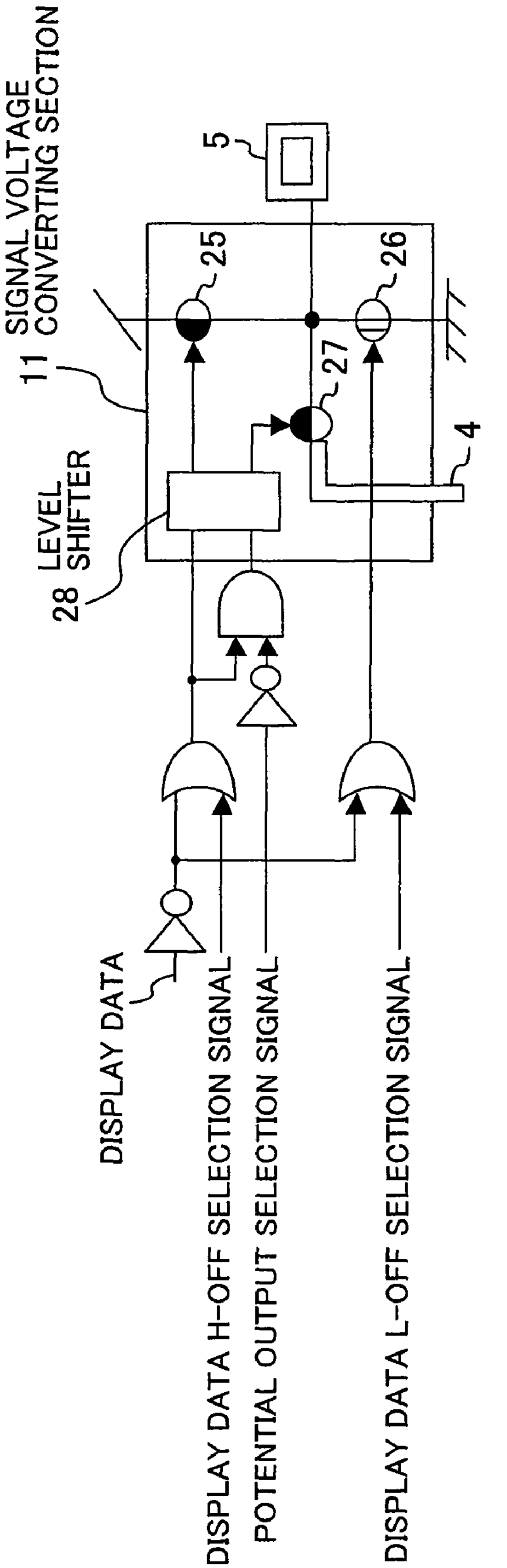
FIG. 10 is a circuit diagram showing a specific example of a signal voltage converting section including an output selection switch circuit of FIG. 9.

FIG. 9 shows still another exemplary configuration of the display drive device of the present invention. FIG. 10 shows a specific example of a signal voltage converting section 11 including an output selection switch circuit 20 of FIG. 9. In FIG. 10, 28 indicates a level shifter. In FIGS. 9 and 10, the output selection switch circuit 20 is provided inside the signal voltage converting section 11. Thereby, layout efficiency can be improved as compared to FIGS. 1, 2, 3 and 5, so that the size of a chip can be suppressed.

Figure 11:
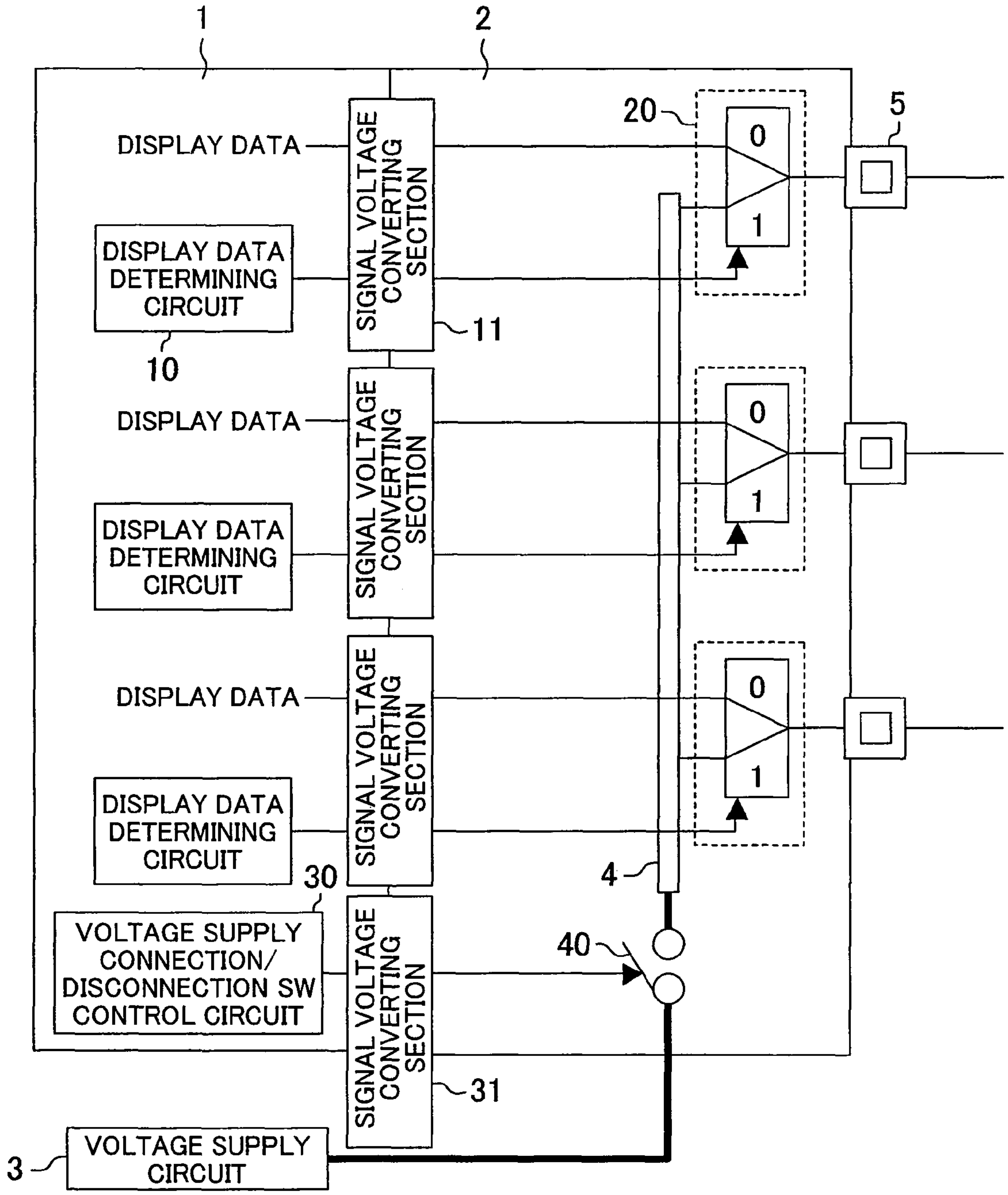
FIG. 11 is a diagram showing still another exemplary configuration of the display drive device of the present invention.
Figure 12:
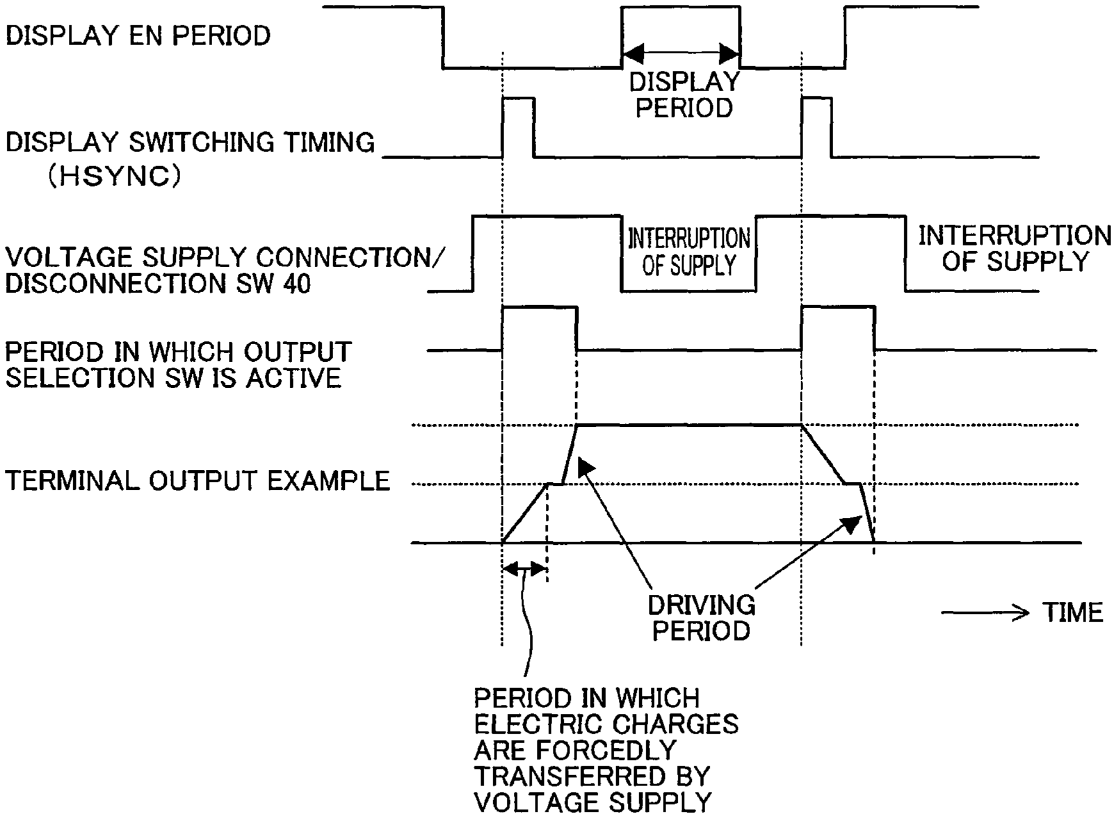
FIG. 12 is a timing chart showing an operation of the display drive device of FIG. 11.

FIG. 11 shows still another exemplary configuration of the display drive device of the present invention. FIG. 12 shows an operation of the display drive device of FIG. 11. In FIG. 11, the display drive device comprises an output selection switch circuit 20 having any of the configurations described above, a voltage supply connection/disconnection switch control circuit 30, a signal voltage converting section 31, and a voltage supply connection/disconnection switch 40.

With the configuration of FIG. 11, the voltage supply connection/disconnection switch 40 is provided between a voltage supply circuit 3 and a common power supply line 4. The voltage supply connection/disconnection switch 40 is controlled at the following timings. The voltage supply connection/disconnection switch 40 is closed slightly before a display switching timing, display is switched, step drive is finished, and the voltage supply connection/disconnection switch 40 is opened for a display period or a period continuing slightly before the next display switching timing. The third power supply potential does not need to be invariably applied to the common power supply line 4 and the common power supply line 4 may be driven only for a required period. Therefore, power consumption in the voltage supply circuit 3 can be further reduced.

Note that the voltage supply connection/disconnection switch 40 may be a switch that can electrically interrupt a path and therefore may be controlled into a high impedance state.

Figure 13:
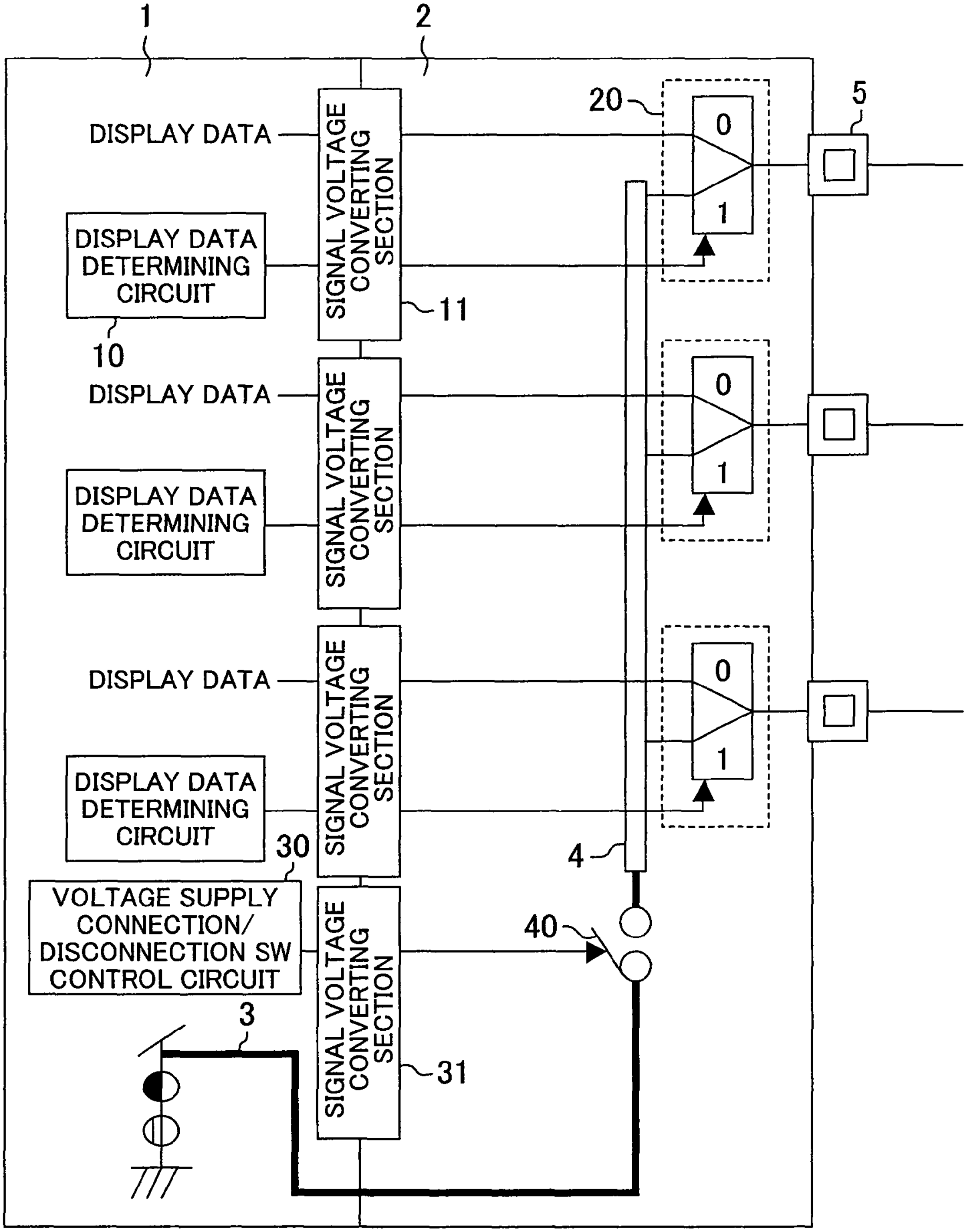
FIG. 13 is a diagram showing still another exemplary configuration of the display drive device of the present invention.
Figure 14:
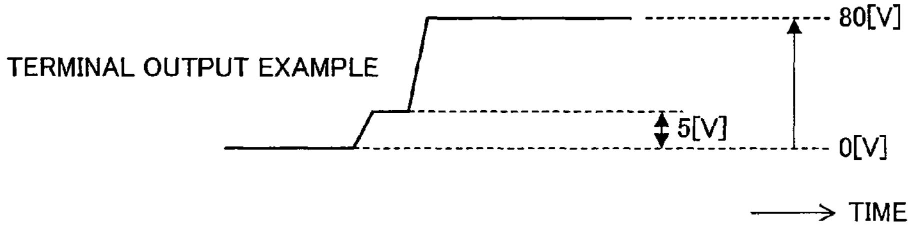
FIG. 14 is a timing chart showing an operation of the display drive device of FIG. 13.

FIG. 13 shows still another exemplary configuration of the display drive device of the present invention. FIG. 14 shows an operation of the display drive device of FIG. 13. As shown in FIGS. 13 and 14, the power supply potential of the voltage supply circuit 3 may be the same as the first power supply potential that is used to drive the low-voltage circuit section 1. Since the common power supply line 4 does not have an optimal potential, the efficiency decreases. However, an existing power supply can be advantageously employed. In addition, although a drive operation is only divided and performed in a stepwise manner, drive power can be expected to be reduced as compared to the case of non-step driving.

Note that a voltage supply circuit 3 equipped with a connection/disconnection switch may be added to FIG. 13 and connected with the low-voltage power supply of FIG. 13 in a wired OR manner. When not required, the common power supply line 4 may be caused to go to the floating potential. This is because, the common power supply line 4 is not perfectly interrupted, and when not required, 3.3 V is supplied to the common power supply line 4, so that high impedance is avoided in the LSI, whereby noise on the common power supply line 4 is reduced, for example.

Figure 15:
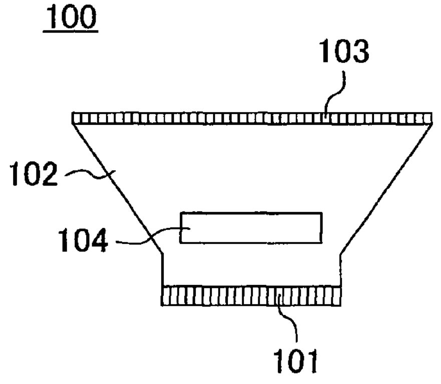
FIG. 15 is a plan view of a module package including the display drive device of the present invention.

FIG. 15 is a plan view of a module package including the display drive device of the present invention. In FIG. 15, the module package 100 comprises a display input signal joint terminal portion 101, an FPC 102, a display output joint terminal portion 103, and a data driver 104 (the display drive device of the present invention).

Figure 16:
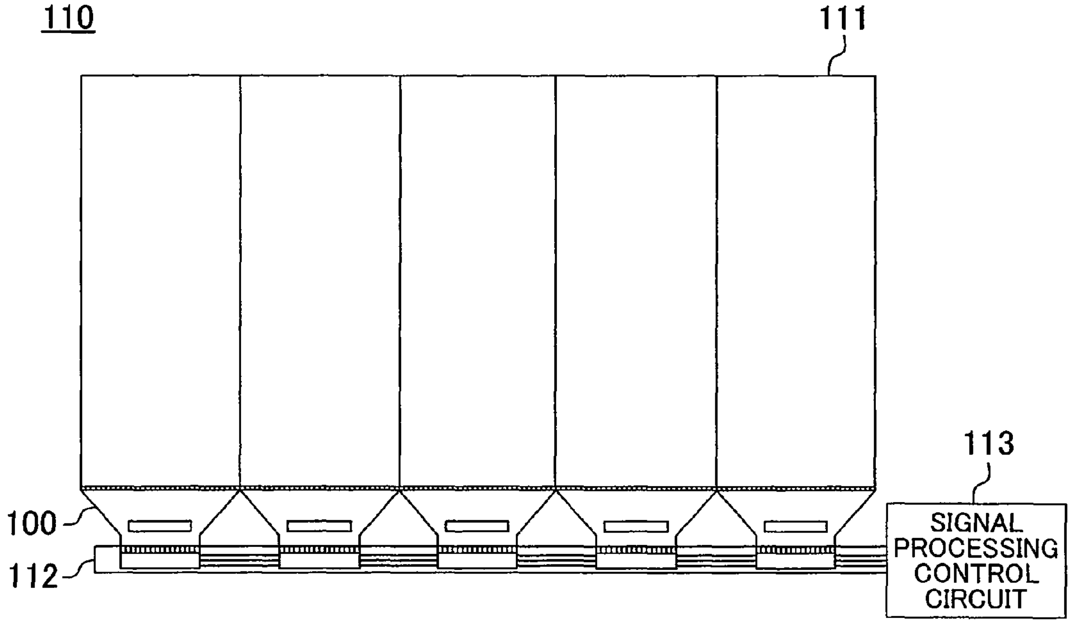
FIG. 16 is a plan view of a panel module employing the module package of FIG. 15.

FIG. 16 is a plan view of a panel module employing the module package 100 of FIG. 15. In FIG. 16, the panel module 110 comprises a PDP panel 111, a display input common circuit board 112, and a signal processing control circuit 113. One module package 100 is provided for each of a plurality of division columns of the PDP panel 111. Reductions in power consumption of the data drivers 104 significantly contribute to a reduction in power consumption of the whole panel module 110.

Figure 17:
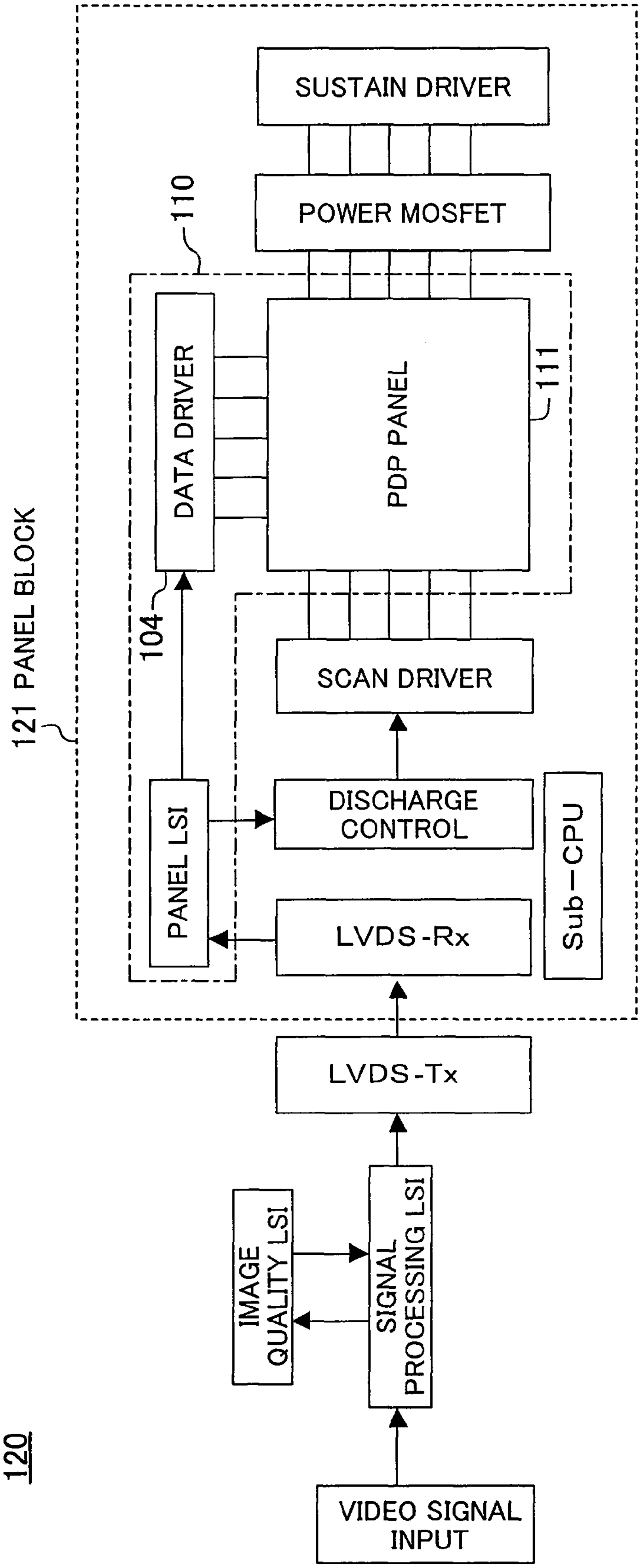
FIG. 17 is a circuit block diagram showing a television set employing the panel module of FIG. 16.

FIG. 17 is a circuit block diagram showing a television set employing the panel module 110 of FIG. 16. In FIG. 17, the television set 120 comprises a panel block 121.

As described above, the present invention can suppress power consumption and heat generation and therefore is useful as a driver for a display panel having capacitive load, such as a PDP, an EL panel or the like.

What is claimed is:

1. A display drive device comprising:

a low-voltage circuit section driven by a first power supply potential;

a high-voltage circuit section driven by a second power supply potential higher than the first power supply potential;

a voltage supply circuit for supplying a third power supply potential higher than or equal to the first power supply potential and different from the second power supply potential;

a common power supply line for connecting the third power supply potential to each of a plurality of output terminals;

an output selection switch circuit for temporarily switching between display data output via the high-voltage circuit section to each output terminal, and the common power supply line, during a predetermined period; and a display data determining circuit for generating a control signal for controlling the output selection switch circuit.

2. The display drive device of claim 1, wherein the output selection switch circuit includes a two-input one-output selector.

3. The display drive device of claim 1, wherein the output selection switch circuit includes a two-input one-output selector and an output connection/disconnection switch.

4. The display drive device of claim 1, wherein the output selection switch circuit includes a display data output selection switch and a potential output selection switch for selecting the third power supply potential.

5. The display drive device of claim 4, wherein the display data output selection switch and the potential output selection switch are controlled so that the display data output selection switch and the potential output selection switch are prevented from being simultaneously turned ON.

6. The display drive device of claim 1, wherein the output selection switch circuit includes a display data output selection switch, a potential output selection switch for selecting the third power supply potential, and an output connection/disconnection switch.

7. The display drive device of claim 1, wherein the output selection switch circuit includes a display data output H selection switch for selecting H-level display data, a display data output L selection switch for selecting L-level display data, and a potential output selection switch for selecting the third power supply potential.

8. The display drive device of claim 7, wherein the display data output H selection switch, the display data output L selection switch, and the potential output selection switch are controlled so that any two thereof are prevented from being simultaneously turned ON.

9. The display drive device of claim 7, wherein the output selection switch circuit is provided in a signal voltage converting section between the low-voltage circuit section and the high-voltage circuit section.

10. The display drive device of claim 1, further comprising:

a voltage supply connection/disconnection switch provided between the voltage supply circuit and the common power supply line.

11. A display module package comprising the display drive device of claim 1.

12. A display panel module comprising the display drive device of claim 1.

13. A television set comprising the display drive device of claim 1.

* * * * *